July 14, 1936.   E. FISCHER   2,047,554
MANUFACTURE OF TUBES FROM POLYSTYRENE AND THE LIKE SUBSTANCES
Filed Feb. 15, 1935
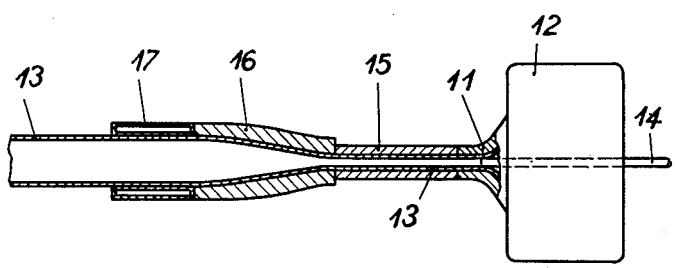
Inventor
Ernst Fischer
by Knight Bros
attorneys Patented July 14, 1936

2,047,554

UNITED STATES PATENT OFFICE 2,047,554

MANUFACTURE OF TUBES FROM POLYSTYRENE AND THE LIKE SUBSTANCES

Ernst Fischer, Berlin-Lichterfelde, Germany, assignor to Siemens-Schuckertwerke Aktiengesellschaft, Berlin-Siemensstadt, Germany, a corporation of Germany Application February 15, 1935, Serial No. 6,637
In Germany February 13, 1934

1 Claim. (Cl. 18—55)

My invention relates to the manufacture of hollow shaped bodies from polystyrene and the like substances.

The manufacture of shaped bodies from polystyrene, i. e., a material appertaining chemically to the group of the polyvinyl compounds presents great difficulties in spite of the thermoplasticity thereof. As is well known polystyrene may be pressed as a matter of fact in a heated state into the desired shape as is possible in the case of the insulating press materials hitherto known. Also experiments have already been carried out to work polystyrene in a manner similar to the well-known metal spraying method for the production of shaped bodies. The shaped bodies thus manufactured present, however, the drawback that they are brittle and inflexible at normal temperatures, so that their possibility of use is considerably restricted.

It has already been proposed to render the shaped bodies of polystyrene less brittle and more pliable by subjecting them during formation to a mechanical stress, i. e., particularly by causing them to elongate during formation. In this manner it was actually possible to manufacture ribbons, filaments, section wires and the like of less brittleness and sufficient pliability so that they may be utilized for a variety of purposes.

However, no method has hitherto been known to continuously produce particularly thin-walled tubular bodies from polystyrene, since the methods hitherto employed in connection with the manufacture of shaped bodies of polystyrene practically only ensure the production of solid bodies. My invention has for its object to provide a method, whereby hollow shaped bodies may be manufactured without losing the greater pliability aforementioned. The invention is shown in diagrammatic form in the accompanying drawing.

The method according to the present invention consists in shaping at a suitably increased temperature preformed and at least partially hollow bodies of polystyrene by means of compressed fluid, particularly in expanding the same and in giving them their final shape. Particularly compressed air may be employed as compressed fluid. The method is preferably carried out so that in forming the body of polystyrene its walls are also stretched at the same time, which reduces the brittleness and increases the pliability of the material.

By way of explanation I may state that this stretching of polystyrene does not merely change mechanically the cross-section of the material, but changes its internal structure. This can be proven easily by means of polarized light. Unstretched, i. e. brittle polystyrene offers free passage for polarized light, while when stretched to the extent at which it becomes flexible, for instance, to at least twice its original dimensions, the material becomes opaque to such light.

As shown in the drawing, and in accordance with the novel method involved in the invention, a pre-shaped polystyrene tube, leaving the mouth of a tube press and still possessing a sufficiently high temperature may pass along a molding channel or a molding calibrator of appreciable length, with which it comes gradually into contact or against which it is gradually pressed. This form of the invention is shown in Fig. 2 in a diagrammatic form. The polystyrene tube 13 leaving the mouth 11 of the tube press 12 is filled with compressed air by means of the compressed air conduit 14 ending in the mouth 11 of the mold and passes for a short distance through the intermediate mold tube 15 having approximately the same inner diameter as the mouth piece 11 and which, if desired, may be designed as cooling tube, so that at the end of the intermediate tube 15 a temperature prevails required for shaping the body to the desired final form. The polystyrene tube 13 then enters the final calibrating tube 16 which gradually increases in size, and in which the diameter of the polystyrene tube is increased to the final value by means of the compressed air introduced therein at the mouth 11 of the press 12.

If desired, a cooling tube 17 may surround the calibrating tube 16 to cool down the polystyrene tube, for instance, to the room temperature. The method may, if desired, be also carried out without the intermediate tube 15, the polystyrene tube 13 travelling in this case freely for a short distance, thus permitting it to expand to a slight extent by the compressed air prior to its introduction into the calibrating tube 16. Owing to the expansion of the polystyrene tube its walls become thinner so that the action of the compressed air on the tubular wall becomes stronger and stronger and is finally limited when the polystyrene tube enters the calibrating tube 16, whose diameter in this form of the invention must be greater than the inner diameter of the mouth 11 of the press 12. In both forms of the invention the polystyrene tube is pressed at a relatively short distance from the press uniformly against the inner wall of the calibrating tube by the compressed air and continuously subject to the compressed air, so that the tightness of the tube to be formed may be easily checked up thereby. The tubes thus produced, after their complete cooling down, may be coiled into rings in any desired manner. To enhance the flexibility the walls of the polystyrene tube may be advantageously corrugated or grooved, which may be either effected by the calibrating tube 16 or also by means of particular devices disposed behind the tube 16. To facilitate the feed of the polystyrene tube special feed devices may be employed, for instance, in the form of a caterpillar tractor, or lubricants may be employed which do not undergo a reaction with the polystyrene.

The method according to the invention is not limited to the use of polystyrene but may also be applicable to similar substances, particularly of the polyvinyl group or other hydrocarbon groups.

I claim as my invention:

The method of continuously forming thin-walled pliable tubes of polystyrene or the like, consisting in extruding a tube of polystyrene of a diameter smaller and of a wall thickness greater than the final tube into a preliminary mold of suitable temperature, introducing a compressed fluid into said smaller tube and gradually expanding said smaller tube by said fluid into a mold of the final tube size while the smaller tube advances during extrusion through the preliminary mold, whereby for a given finally expanded tube size and wall thickness the relation between the diameter of the smaller tube and its wall thickness is chosen so that the material is sufficiently stretched during expansion into final size, to diminish its brittleness.

ERNST FISCHER.